US008486539B2

(12) United States Patent
Klein et al.

(10) Patent No.: US 8,486,539 B2
(45) Date of Patent: Jul. 16, 2013

(54) COATING COMPOSITIONS AND COATINGS PRODUCED FROM THEM WITH HIGH SCRATCH RESISTANCE, WEATHERING STABILITY, AND GOOD OPTICAL PROPERTIES

(75) Inventors: Günter Klein, Münster (DE); Björn Feldmann, Münster (DE); Sabine Holtschulte, Düsseldorf (DE); Silke Hottenbacher, Münster (DE); Andreas Poppe, Shanghai (CN); Ulrike Clausen-Meiring, Senden (DE)

(73) Assignee: BASF Coatings GmbH, Münster (DE)

( * ) Notice: Subject to any disclaimer, the term of this patent is extended or adjusted under 35 U.S.C. 154(b) by 2 days.

(21) Appl. No.: 13/132,847

(22) PCT Filed: Aug. 22, 2009

(86) PCT No.: PCT/EP2009/006110
§ 371 (c)(1),
(2), (4) Date: Jun. 22, 2011

(87) PCT Pub. No.: WO2010/063332
PCT Pub. Date: Jun. 10, 2010

(65) Prior Publication Data
US 2011/0245406 A1  Oct. 6, 2011

(30) Foreign Application Priority Data
Dec. 5, 2008 (DE) .......................... 10 2008 060 454

(51) Int. Cl.
C08L 67/04 (2006.01)
B32B 27/36 (2006.01)

(52) U.S. Cl.
USPC .................. 428/480; 525/440.03; 528/23

(58) Field of Classification Search
None
See application file for complete search history.

(56) References Cited

U.S. PATENT DOCUMENTS

| 4,598,131 | A | 7/1986 | Prucnal |
| 4,710,542 | A | 12/1987 | Forgione et al. |
| 5,516,559 | A | 5/1996 | Rockrath et al. |
| 5,716,678 | A | 2/1998 | Rockrath et al. |
| 5,908,895 | A * | 6/1999 | Vogt-Birnbrich et al. .... 524/591 |
| 6,403,699 | B1 | 6/2002 | Rockrath et al. |
| 7,858,732 | B2 * | 12/2010 | Bruchmann et al. .......... 528/272 |
| 2003/0027921 | A1 | 2/2003 | Speier et al. |
| 2005/0165177 | A1 | 7/2005 | Wagner et al. |
| 2007/0059532 | A1 * | 3/2007 | Ramesh et al. ............. 428/423.1 |
| 2007/0213501 | A1 | 9/2007 | Bruchmann et al. |
| 2008/0245999 | A1 | 10/2008 | Poppe et al. |
| 2009/0275680 | A1 | 11/2009 | Bruchmann et al. |
| 2009/0281271 | A1 | 11/2009 | Bruchmann et al. |
| 2010/0015344 | A1 | 1/2010 | Groenewolt et al. |
| 2010/0028544 | A1 | 2/2010 | Groenewolt et al. |
| 2010/0143596 | A1 * | 6/2010 | Groenewolt et al. ......... 427/379 |
| 2011/0263789 | A1 * | 10/2011 | Taniguchi et al. ............. 524/599 |

FOREIGN PATENT DOCUMENTS

| DE | 102005045228 A1 | 4/2007 |
| DE | 102007026722 A1 | 12/2008 |
| EP | 0 008 127 A1 | 2/1980 |
| EP | 0 245 700 A2 | 11/1987 |
| EP | 0 249 201 A2 | 12/1987 |
| EP | 0 276 501 A2 | 8/1988 |
| EP | 0 626 888 A1 | 12/1994 |
| EP | 0 692 007 A1 | 1/1996 |
| EP | 0 991 690 B1 | 4/2000 |
| EP | 0 994 117 A1 | 4/2000 |
| EP | 1 273 640 A2 | 1/2003 |
| EP | 1334989 * | 8/2003 |
| WO | WO-94/22968 A1 | 10/1994 |
| WO | WO-97/12945 A1 | 4/1997 |
| WO | WO-03/093343 A1 | 11/2003 |
| WO | WO-2005/003340 A2 | 1/2005 |
| WO | WO-2005/118677 A1 | 12/2005 |
| WO | WO-2008/074489 A1 | 6/2008 |
| WO | WO-2008/074491 A1 | 6/2008 |

OTHER PUBLICATIONS

Machine translation into English of EP 1334989 (Aug. 2003).*
B. Singh, et al.: "Carbamylmethylated Melamines Novel Crosslinkers for the Coatings Industry," American Cyanamid Co., Stamford, Ct., pp. 193-207.
Ulrich Zorll: Rompp Lexikon. Lacke and Druckfarben, pp. 250-252.
English Translation of the International Preliminary Report on Patentability, established Jun. 7, 2011, incorporating the English Translation of the Written Opinion of the ISA.

* cited by examiner

Primary Examiner — Marc Zimmer
(74) Attorney, Agent, or Firm — Quinn Law Group, PLLC

(57) ABSTRACT

The invention relates to coating compositions comprising
(a) at least one hydroxyl-containing compound (A),
(b) at least one saturated compound (B) having free and/or blocked isocyanate groups and containing at least in part hydrolyzable silane groups, and
(c) at least one catalyst (D) for the crosslinking of silane groups,
wherein the coating composition comprises as hydroxyl-containing compound (A) at least one hyperbranched, dendritic hydroxy-functional polyester in which on average at least one hydroxyl function of the polyester is esterified with at least one acid selected from the group of the isomeric C8 to C9 monocarboxylic acids.
The present invention also provides a multistage coating method using these coating compositions, and also the use of the coating compositions as clearcoat material for producing multicoat effect and/or color paint systems, and use of the coating method for automotive OEM finishing and automotive refinish.

20 Claims, No Drawings

COATING COMPOSITIONS AND COATINGS PRODUCED FROM THEM WITH HIGH SCRATCH RESISTANCE, WEATHERING STABILITY, AND GOOD OPTICAL PROPERTIES

This application is a 371 U.S. National Stage of International Application No. PCT/EP2009/006110, filed Aug. 22, 2009, which claims the benefit of German Patent Application No. DE102008060454.2, filed Dec. 5, 2008, the disclosures of both of these applications being incorporated herein by reference.

The present invention relates to coating compositions comprising
  (a) at least one hydroxyl-containing compound (A),
  (b) at least one compound (B) having free and/or blocked isocyanate groups, and containing at least in part hydrolyzable silane groups, and
  (c) at least one catalyst (D) for the crosslinking of silane groups, The invention also relates to a multistage coating method using these coating compositions, and also to the use of the coating compositions as clearcoat material, and use of the coating method for automotive OEM finishing and automotive refinish.

EP-A-1 273 640 describes coating compositions comprising a polyol component and a crosslinker component consisting of aliphatic and/or cycloaliphatic polyisocyanates, 0.1 to 95 mol % of the free isocyanate groups originally present having undergone reaction with bisalkoxysilylamine. Polyol components which can be used in the coating compositions described there include all typically employed OH components, such as, for example, hydroxyl-containing polyacrylate copolymers and/or polymethacrylate copolymers, polyester polyols, polycarbonate diols, polyether polyols or urethane- and ester-group-containing polyols or mixtures thereof.

These coating compositions described in EP-A-1 273 640 can be used for OEM finishing and exhibit good scratch resistance in conjunction with good stability toward environmental influences. However, these coating compositions have a particularly strong tendency toward post-crosslinking, since conversion on thermal curing after application is inadequate. This has adverse effects especially for the weathering stability. Moreover, the optical properties, particularly the appearance, of the resulting coatings are still in need of improvement. This is especially the case when the aim is to achieve a combination of clearcoat properties with good appearance in tandem with retention of high scratch resistance, i.e., good results in the hammer test. In principle, conventional polyesters can be used to achieve an improvement in appearance, but such improvements lead simultaneously to a reduction in the mechanical properties.

Further, EP-A-994 117 describes moisture-curable mixtures which comprise a polyol component and a polyisocyanate component that may in part have been reacted with a monoalkoxysilylalkylamine that has undergone reaction preferably to form an aspartate. Polyol components employed are polyester polyols, polyether polyols, polyhydroxy polycarbonates, polyhydroxy acetals, polyhydroxy polyacrylates, polyhydroxy polyesteramides, and polyhydroxy polythioethers, but polyhydroxy polyacrylates are particularly preferred. Although coatings formed from such mixtures do have a certain hardness, they are nevertheless of only limited suitability for OEM applications in terms of their weathering stability and, in particular, their scratch resistance. Moreover, here again, the optical properties, and particularly the appearance, of the resulting coatings are still in need of improvement.

Known from WO 2008/074489, furthermore, are coating compositions which lead to coatings combining high scratch resistance with good weathering stability. These coating compositions comprise at least one hydroxyl-containing compound (A), and at least one isocyanato-containing compound (B), with one or more constituents of the coating composition containing hydrolyzable silane groups. It is essential to the invention that the coating compositions described therein comprise, as catalyst (D) for the crosslinking of the silane groups, phosphorus-containing catalysts, especially amine-blocked partial ethylhexyl esters of phosphoric acid.

Also known from WO 2008/074491, furthermore, are coating compositions which lead to coatings combining high scratch resistance with good weathering stability. These coating compositions comprise at least one hydroxyl-containing compound (A) and at least one isocyanato-containing compound (B), it being essential to the invention that some of the isocyanate groups of the compound (B) have been reacted with a mixture of bisalkoxysilylamine (Ia), preferably bis[3-(trimethoxysilyl)propyl]amine, and a monoalkoxysilylamine (IIa), preferably N-[3-(trimethoxysilyl)propyl]-butylamine.

Hydroxyl-containing compounds used in coating compositions of WO 2008/074491 and WO 2008/074489 are polyester polyols, polyurethane polyols, polysiloxane polyols, and, preferably, polyacrylate polyols and/or polymethacrylate polyols. The coating compositions described in WO 2008/074491 and WO 2008/074489, however, are to be improved still further in terms of their optical properties, especially in terms of the appearance.

It is known that the use of polyester binders in comparison to poly(meth)acrylate binders lead frequently, on account of the improved compatibility with standard crosslinkers, to an improvement in the optical properties of the resulting coating. At the same time, however, the use of polyester binders often results in a deterioration in the hardness and scratch resistance and also in the chemical resistance and acid resistance of the resulting coating. In particular, the initial hardness directly after curing is often too low, and as a result there may be difficulties in terms of processability, particularly in a sanding and polishing operation.

WO 03/093343 A1 describes high-functionality, hyperbranched, hydroxy-functional polyesters which can be used in coatings and paints. The high-functionality hyperbranched polyesters described therein, however, are molecularly and structurally nonuniform, and so can indeed be produced with low levels of cost and complexity but can be used only conditionally for achieving a high solids fraction while at the same time imparting good optical properties in coating compositions. Furthermore, the polyesters described therein lack general compatibility with apolar, aprotic solvents.

EP 991 690 B1 describes a process for the synthesis of polymeric polyalcohols composed substantially of polyester units, providing hyperbranched, dendritic polyesters having unprotected or protected hydroxyl end groups. The products according to the process can be functionalized or terminated with various groups. No end use is specified for the polyesters to be prepared by the process described.

Finally, the as-yet unpublished German patent application DE 102007026722.5-43 describes coating compositions which comprise at least one hyperbranched dendritic hydroxy-functional polyester having an OH number ≧180 mg KOH/g, measured via DIN 53240, and also polyisocyanates as crosslinking agents. The use of isocyanates which contain at least in part hydrolyzable silane groups, however, is not described in that text.

Problem

It was an object of the present invention, therefore, to provide coating compositions, particularly for the clearcoat in OEM finishes and automotive refinishes, that lead to coatings having a combination of high scratch resistance, good acid resistance, and good weathering stability, with at the same time a very good overall appearance.

The aim was therefore to provide coating compositions which lead to a network with a high degree of weathering stability and which at the same time ensure high acid resistance. In addition, the coating compositions are to lead to coatings which already have a high degree of scratchproofing straight after thermal curing, and in particular a high level of gloss retention after scratch exposure. Moreover, the coatings and coating systems, especially the clearcoat systems, ought to be able to be produced even in film thicknesses >40 µm without stress cracks occurring. This is a key requirement for the use of the coatings and coating systems, particularly of the clearcoat systems, in the technologically and esthetically particularly demanding field of automotive OEM finishing. The intention in particular was to provide clearcoat systems featuring high resistance, particularly to cracking, under weathering with UV radiation in a wet/dry cycle, in combination with outstanding scratchproofing.

At the same time the coating compositions ought, however, also to exhibit good leveling and lead to coatings having a good overall appearance. The surface profile of the applied and baked coating films was measured using the Wavescan method, which permits measurement of the visible profile of coating film surfaces. For this purpose the intensity of the reflection ("waviness") was measured using the "Wave Scan" instrument from Byk-Gardner, with 1250 points being recorded over a distance of 10 cm. The instrument breaks down the reflection into a longwave component ("longwave"), i.e., the variance in light intensity for structures in the range from 0.6 mm to 10 mm, and a shortwave component, i.e., the variance in light intensity for structures in the range from 0.1 mm to 0.6 mm. For a good appearance, low longwave measurements of the resulting coatings in tandem with very low film thicknesses are particularly critical.

Solution to the Problem

In the light of the above objectives, coating compositions based on aprotic solvents have been found, comprising
(a) at least one hydroxyl-containing compound (A),
(b) at least one saturated compound (B) having free and/or blocked isocyanate groups and containing at least in part hydrolyzable silane groups, and
(c) at least one catalyst (D) for the crosslinking of silane groups,
wherein the coating composition comprises as hydroxyl-containing compound (A) at least one hyperbranched, dendritic hydroxy-functional polyester in which on average at least one hydroxyl function of the polyester is esterified with at least one acid selected from the group of the isomeric C8 to C9 monocarboxylic acids.

In the light of the prior art it was surprising and unforeseeable for the skilled worker that the objects on which the present invention was based could be achieved by means of the coating composition of the invention, based on aprotic solvents.

Thus it is particularly surprising that the coating compositions of the invention produce new coatings and coating systems, especially clearcoat systems, which are highly scratchproof and, in contrast to common, highly crosslinked scratchproof systems, are acid-resistant. Moreover, the coatings and coating systems of the invention, especially the clearcoat systems, can be produced even in film thicknesses >40 µm without stress cracks occurring. Consequently the coatings and coating systems of the invention, especially the clearcoat systems, can be used in the technologically and esthetically particularly demanding field of automotive OEM finishing. In that context they are distinguished by particularly high carwash resistance and scratchproofing. The high scratch resistance of the coatings exists in particular directly after their final curing, and so the coatings can be handled without problems immediately after final curing.

Moreover, the resistance of the coatings of the invention to cracking under UV radiation and wet/dry cycling in the CAM180 test (to DIN EN ISO 11341 February 98 and DIN EN ISO 4892-2 November 00), in combination with a high scratch resistance, is outstanding.

Furthermore, it is surprising that the coating compositions at the same time also lead to coatings having a good overall appearance. The surface profile of the applied and baked coating films was measured using the Wavescan method, which permits measurement of the visible profile of coating film surfaces. For this purpose the intensity of the reflection ("waviness") was measured using the "Wave Scan" instrument from Byk-Gardner, with 1250 points being recorded over a distance of 10 cm. The instrument breaks down the reflection into a longwave component ("longwave"), i.e., the variance in light intensity for structures in the range from 0.6 mm to 10 mm, and a shortwave component, i.e., the variance in light intensity for structures in the range from 0.1 mm to 0.6 mm. For a good appearance, low longwave measurements of the resulting coatings in tandem with very low film thicknesses are particularly critical. The coatings of the invention are distinguished, then, both by low "longwave" and by low "shortwave" values.

Finally, the components according to the invention can be prepared with particular ease and with very good reproducibility and on application of the coating material cause no significant toxicological or environmental problems.

DESCRIPTION OF THE INVENTION

The Hyperbranched, Dendritic Hydroxy-Functional Polyesters (A)

It is essential to the invention that the coating compositions of the invention comprise at least one hyperbranched, dendritic hydroxy-functional polyester. Hyperbranched, dendritic compounds, i.e., hyperbranched dendritic macromolecules and dendrimers, can be described generally as three-dimensional, highly branched molecules having a treelike structure. Dendrimers are highly symmetrical, whereas similar macromolecules referred to as being hyperbranched and/or dendritic may be asymmetric to a certain extent and nevertheless retain the highly branched treelike structure. Hyperbranched and dendritic macromolecules can typically be prepared starting from an initiator or nucleus having one or more reactive sites and a number of branching layers ("generations") and, if appropriate, a layer of chain-ending molecules (divergent synthesis approach). The continued replication of branching layers normally produces an increased multiplicity of branching, and if appropriate or if desired, an increased number of end groups. The layers are referred to typically as generations, and the branches as dendrons.

To attain optimum results it is essential to the invention that on average at least one hydroxyl function of the hyperbranched, dendritic hydroxy-functional polyester is esterified with at least one acid selected from the group of the isomeric C8-C9 monocarboxylic acids. In particular it is possible in this way to achieve a satisfactory residual gloss. The aforedescribed esterification with at least one C8-C9 carboxylic acid is also referred to synonymously as "acid modification".

The radical of the isomeric C8-C9 monocarboxylic acid is preferably saturated. Clearcoat compositions of this kind exhibit good weathering stability.

Particularly advantageous properties in the sense of the invention result when the radical of the C8-C9 monocarboxylic acid is the radical of octanoic acid or isononanoic acid. With particular preference isononanoic acid is the C8-C9 monocarboxylic acid used.

The polyester in such clearcoat compositions preferably has a hydroxyl number of $\geq 180$ mg KOH/g, more particularly a hydroxyl number of >180 mg KOH/g, preferably 185-240 mg KOH/g, determined in accordance with DIN 53240. Use is made in particular of polyesters which have a hydroxy functionality (given via the number of free and of esterified hydroxyl groups of the hydroxy-functional polyester) of greater than 16. Such clearcoat compositions possess a sufficient microhardness (i.e., >90 N/mm2, determined in accordance with DIN EN ISO 14577 using the Fischerscope instrument from Fischer, with a maximum force of 25.6 mN), and are scratchproof and chemical-resistant.

The polyester preferably has an acid number $\leq 8.0$, preferably 0-6.0, determined in accordance with DIN 53402. Such acid numbers of the polyesters in the clearcoat formulations described result in better compatibility of these polyesters with other coating base materials, and in improved leveling.

The polyester, furthermore, preferably possesses a number-average molecular weight of 1500-4000 g/mol, preferably 2000-3500 g/mol, determined via GPC with a polystyrene standard in THF with 0.1 mol/l acetic acid. A low molecular weight of this kind in combination with a correspondingly low molecular weight distribution on the part of the dendritic polyester leads generally to improved compatibility.

Preference is given to using polyesters with a polydispersity Mw/Mn<4. Particularly good properties result when the polyester has an even lower polydispersity, i.e., Mw/Mn<2.5, more particularly Mw/Mn$\leq$2.0.

It is particularly preferred to use monodisperse or substantially monodisperse polyesters, which can be prepared easily, reliably, and reproducibly, and whose properties and end structures can be easily modified.

Polyesters of this kind can be prepared via a partial esterification of a hydroxy-functional polyester, which is preparable in turn via a method for the synthesis of a dendritic polymeric polyalcohol (polyester polyol) having reactive and, if desired, protected hydroxyl end groups, in accordance with EP 991 690 B1, where the polymeric polyalcohol possesses n dendritic branches originating from a monomeric or polymeric initiator molecule having n reactive groups (A1), each branch comprising g branching generations, each generation comprising at least one polymeric or monomeric branching chain extender having three functional groups, of which at least two are reactive hydroxyl groups (A2) and one is a carboxyl group (A3) which is reactive with the reactive group (A1) and/or with the hydroxyl groups (A2), and, if desired, at least one spacer generation which comprises at least one spacer chain extender having two functional groups, of which one is a protected hydroxyl group (A2") and one is a group (A4) which is reactive with a hydroxyl group, with n and g being whole numbers and being at least 1, where (i) the two hydroxyl groups (A2) of the monomeric or polymeric chain branching extender used are acetal-protected hydroxyl groups (A2'), the protection by acetal being obtained through a reaction between the two hydroxyl groups (A2) and an acetal-forming carbonyl compound; and (ii) where a first branching generation is added to the initiator molecule through reaction between the reactive group (A1) and the carboxyl group (A3), in a molar ratio of the reactive groups (A1) to the carboxyl groups (A3) of at least 1, to give a polymeric polyalcohol having acetal-protected hydroxyl groups (A2') and n dendritic branches which comprise one generation, the acetal-protected hydroxyl groups (A2') being deprotected, if desired, by means of acetal cleavage, to give a polymeric polyalcohol having reactive hydroxyl groups (A2); and (iii) where further branching generations are added in g−1 repeated steps, through reaction between reactive hydroxyl groups (A2), obtained by deprotection by means of acetal cleavage, and carboxyl groups (A3), in a molar ratio of hydroxyl groups (A2) to carboxyl groups (A3) of at least 1, to give a polymeric polyalcohol having acetal-protected hydroxyl groups (A2') and n dendritic branches which comprise two or more generations, the acetal-protected hydroxyl groups (A2') being deprotected, if desired, by means of acetal cleavage, to give a polymeric polyalcohol having reactive hydroxyl groups (A2), and if desired, (iv) step (ii) and/or each repetition of step (iii) individually is followed by (a) a partial protection, such as protection as an acetal, ketal and/or ester, for example, of available reactive hydroxyl groups (A2), giving a polymeric polyalcohol having at least one reactive hydroxyl group (A2) for use in step (iii) or in a repeated step (ii), and/or (b) the addition of the optional spacer chain extender, which addition, following deprotection of the protected hydroxyl group (A2"), produces a polymeric polyalcohol having reactive hydroxyl groups (A2) for use in step (iii) or in a repeated step (iii) and n dendritic branches which comprise one or more branching generations, and at least one spacer generation is at least a sub-generation.

Besides the hyperbranched, dendritic hydroxy-functional polyesters (A) that are essential to the invention, the coating compositions of the invention may if desired further comprise other hydroxyl-containing compounds (C). Other hydroxyl-containing compounds (C) used may be not only low molecular weight polyols but also oligomeric and/or polymeric polyols. Particular preference is given as component (C) to non-component (A) polyester polyols, polyurethane polyols, polysiloxane polyols, and, in particular, polyacrylate polyols and/or polymethacrylate polyols, and also copolymers thereof, referred to below as polyacrylate polyols. These optional compounds (C) are used generally in an amount of 0% to 30% by weight, based on the total weight of the coating composition.

The Isocyanato Compounds (B)

The di- and/or polyisocyanates which serve as core structures for the isocyanato compounds (B) used preferably in accordance with the invention are preferably conventional saturated, substituted or unsubstituted, aromatic, aliphatic, cycloaliphatic and/or heterocyclic polyisocyanates. Examples of preferred polyisocyanates are as follows: 2,4- toluene diisocyanate, 2,6-toluene diisocyanate, diphenylmethane 4,4'-diisocyanate, diphenylmethane 2,4'-diisocyanate, p-phenylene diisocyanate, biphenyl diisocyanates, 3,3'-dimethyl-4,4'-diphenylene diisocyanate, tetramethylene 1,4-diisocyanate, hexamethylene 1,6-diisocyanate, 2,2,4-trimethylhexane 1,6-diisocyanate, isophorone diisocyanate, ethylene diisocyanate, 1,12-dodecane diisocyanate, cyclobutane 1,3-diisocyanate, cyclohexane 1,3-diisocyanate, cyclohexane 1,4-diisocyanate, methylcyclohexyl diisocyanates, hexahydrotoluene 2,4-diisocyanate, hexahydrotoluene 2,6-diisocyanate, hexahydrophenylene 1,3-diisocyanate, hexahydrophenylene 1,4-diisocyanate, perhydrodiphenylmethane 2,4'-diisocyanate, 4,4'-methylenedicyclohexyl diisocyanate (e.g., Desmodur® W from Bayer AG), tetramethyixylyl diisocyanates (e.g., TMXDI® from American Cyanamid), and mixtures of the aforementioned polyisocyanates. Further-preferred polyisocyanates are the biuret dimers and the isocyanurate trimers of the aforementioned diisocyanates.

Particularly preferred polyisocyanates PI are hexamethylene 1,6-diisocyanate, isophorone diisocyanate, and 4,4'-methylenedicyclohexyl diisocyanate, their biuret dimers and/or isocyanurate trimers.

In a further embodiment of the invention the polyisocyanates are polyisocyanate prepolymers with urethane structural units, which are obtained by reacting polyols with a stoichiometric excess of aforementioned polyisocyanates. Polyisocyanate prepolymers of this kind are described in U.S. Pat. No. 4,598,131, for example.

It is essential to the invention that the isocyanato compound (B) contains at least in part hydrolyzable silane groups. These hydrolyzable silane groups lead to the construction of the Si—O—Si network which is distributed statistically in the finally cured coating. This means that there is no deliberate accumulation or depletion of the Si—O—Si network in particular regions of the coating.

It is preferred if the compound (B) comprises between 2.5 and 97.5 mol %, based on the entirety of structural units (I) and (II), of at least one structural unit of the formula (I)

  (I)

where
R'=hydrogen, alkyl or cycloalkyl, it being possible for the carbon chain to be interrupted by nonadjacent oxygen, sulfur or NRa groups, with Ra=alkyl, cycloalkyl, aryl or aralkyl, preferably R'=ethyl and/or methyl X,X'=linear and/or branched alkylene or cycloalkylene radical having 1 to 20 carbon atoms, preferably X, X'=alkylene radical having 1 to 4 carbon atoms
R"=alkyl, cycloalkyl, aryl, or aralkyl, it being possible for the carbon chain to be interrupted by nonadjacent oxygen, sulfur or NRa groups, with Ra=alkyl, cycloalkyl, aryl or aralkyl, preferably R"=alkyl radical, in particular having 1 to 6 C atoms,
n=0 to 2, m=0 to 2, m+n=2, and
x, y=0 to 2,
and
between 2.5 and 97.5 mol %, based on the entirety of structural units (I) and (II), of at least one structural unit of the formula (II)

  (II), where
Z=—NH—, —NR—, with
R=alkyl, cycloalkyl, aryl or aralkyl, it being possible for the carbon chain to be interrupted by nonadjacent oxygen, sulfur or NRa groups, with Ra=alkyl, cycloalkyl, aryl or aralkyl, x=0 to 2, and
X, R', R" have the definition stated in the case of formula (I).

The respective preferred alkoxy radicals (OR') may be alike or different; critical for the structure of the radicals, however, is the extent to which they influence the reactivity of the hydrolyzable silane groups. Preferably R' is an alkyl radical, more particularly having 1 to 6 C atoms. Particular preference is given to radicals R' which increase the reactivity of the silane groups, i.e., which represent good leaving groups. With that aim in mind, a methoxy radical is preferred over an ethoxy radical, which is preferred in turn over a propoxy radical. With particular preference, therefore, R'=ethyl and/or methyl, more particularly methyl.

Furthermore, the reactivity of organofunctional silanes may also be influenced considerably by the length of the spacers X between silane functionality and organic functional group that serves for reaction with the modifying constituent. As examples of this, mention may be made of the "alpha" silanes available from Wacker, in which a methylene group is between the Si atom and the functional group, rather than the propylene group that is present in the case of "gamma" silanes.

The isocyanato compounds (B) functionalized with the structural units (I) and (II) that are particularly preferred in accordance with the invention are obtained with particular preference by reaction of the aforementioned di- and/or polyisocyanates with a compound of the formula (Ia)

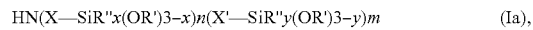  (Ia), and with a compound of the formula (IIa)

  (IIa), the substituents having the definition stated above.

Compounds (Ia) preferred in accordance with the invention are bis(2-ethyltrimethoxysilyl)amine, bis(3-propyltrimethoxysilyl)amine, bis(4-butyltrimethoxysilyl)amine, bis(2-ethyltriethoxysilyl)amine, bis(3-propyltriethoxysilyl)amine and/or bis(4-butyltriethoxysilyl)amine. Bis(3-propyltrimethoxysilyl)amine is especially preferred. Aminosilanes of this kind are available, for example, under the brand name DYNASILAN® from DEGUSSA or Silquest® from OSI.

Compounds (IIa) that are preferred in accordance with the invention are aminoalkyltrialkoxysilanes, such as, preferably, 2-aminoethyltrimethoxy-silane, 2-aminoethyltriethoxysilane, 3-aminopropyltrimethoxysilane, 3-aminopropyltriethoxysilane, 4-aminobutyltrimethoxysilane, 4-aminobutyltriethoxysilane. Particularly preferred compounds (IIa) are N-(2-(trimethoxysilyl)ethyl)alkylamines, N-(3-(trimethoxysilyl)propyl)alkylamines, N-(4-(trimethoxysilyl)butyl)alkylamines, N-(2-(triethoxysilyl)ethyl)alkyl-amines, N-(3-(triethoxysilyl)propyl)alkylamines and/or N-(4-(triethoxysilyl)-butyl)alkylamines. N-(3-(Trimethoxysilyl)propyl)butylamine is especially preferred. Aminosilanes of this kind are available, for example, under the brand name DYNASILAN® from DEGUSSA or Silquest® from OSI.

The isocyanato compounds (B) functionalized with the structural units (I) and (II) that are especially preferred in accordance with the invention are prepared with particular preference by reaction of the aforementioned di- and/or polyisocyanates with the aforementioned compounds (Ia) and (IIa), with reaction of
between 2.5 and 90 mol %, preferably 5 to 85 mol %, more preferably 7.5 to 80 mol %, of the isocyanate groups in the core polyisocyanate structure with at least one compound (Ia) and to between 2.5 and 90 mol %, preferably 5 to 85 mol %, more preferably 7.5 to 80 mol %, of the isocyanate groups in the core polyisocyanate structure with at least one compound (IIa).

The total fraction of the isocyanate groups reacted with the compounds (Ia) and (IIa) in the polyisocyanate compound (B) is between 5 and 95 mol %, preferably between 10 and 90 mol %, more preferably between 15 and 85 mol % of the isocyanate groups in the core polyisocyanate structure.

Especially preferred isocyanato compounds (B) are reaction products of hexamethylene 1,6-diisocyanate and/or isophorone diisocyanate, and/or isocyanurate trimers thereof, with bis(3-propyltrimethoxysilyl)amine and N-(3-(trimethoxysilyl)propyl)butylamine.

The solids content of the polyisocyanate curing agent used in accordance with the invention is advantageously at least 50% by weight, preferably at least 70% by weight.

The polyisocyanate curing agent used in accordance with the invention preferably comprises at least one water scavenger, examples being reactive silanes having a higher reactivity toward water than do isocyanates. As water scavengers it is advantageous in particular to use trialkyl esters of orthoformic acid. A particularly preferred water scavenger used is triethyl orthoformate. Preference is given to adding 0.01% to 10% by weight, preferably 0.03% to 5.0% by weight, of at least one water scavenger, based on the total amount of nonvolatiles in the coating composition.

The reaction of the isocyanato compounds (B) with the compounds (Ia) and (IIa) takes place preferably in an inert gas atmosphere at temperatures of not more than 100° C., preferably of not more than 60° C. The reaction of the isocyanato compounds (B) with the compounds (Ia) and (IIa) takes place preferably in a solvent or in a solvent mixture in the presence of at least one water scavenger and in the presence of at least one amine, preferably in the presence of at least one tertiary amine, such as, for example, 1,4-diazabicyclo[2.2.2]octane (DABCO), triethylamine and diisopropylethylamine, especially triethylamine.

Preferably, during the synthesis, at least 1%, preferably at least 2%, more preferably at least 3%, and very preferably at least 4% by weight of at least one water scavenger, preferably triethyl orthoformate, is added, based on the total amount of nonvolatiles in the reaction mixture.

Preferably the amine is used during the synthesis in an amount of 2% to 6% by weight, based on the total amount of nonvolatiles in the reaction mixture. Particular preference is given to using triethylamine during the synthesis in an amount of 1.5% to 3.5% by weight, based on the total amount of nonvolatiles in the reaction mixture.

The solvent or solvent mixture in which the polyisocyanate curing agents are prepared may be composed of aromatic hydrocarbons such as 1,2,4-trimethylbenzene, mesitylene, xylene, propylbenzene and isopropylbenzene. One example of a suitable solvent mixture comprising aromatic hydrocarbons is solvent naphtha. The solvent in which the polyisocyanate curing agents are prepared may also be composed of aliphatic hydrocarbons, ketones, such as acetone, methyl ethyl ketone or methyl amyl ketone, esters, such as ethyl acetate, butyl acetate, pentyl acetate or ethyl ethoxy propionate, ethers or mixtures of the aforementioned solvents, preference being given to solvent mixtures having a high butyl acetate fraction, more particularly at least 60% by weight of butyl acetate, based on the total weight of the solvent mixture. With particular preference the solvent mixture contains at least 80% by weight of butyl acetate, more particularly at least 95% by weight of butyl acetate. Very particular advantage attaches to working in pure butyl acetate.

Alternatively the polyisocyanate curing agent can also be prepared preferably by reacting in a first step on average per molecule not more than one of the isocyanate groups of the polyisocyanate with the amino-functional alkoxysilane and in a second step reacting the resulting intermediate by dimerization, trimerization, urethanization, biuretization or allophanatization to form a polyisocyanate.

The free isocyanate groups of the isocyanato compounds B can also be used in a blocked form. This is preferably the case when the coating compositions of the invention are used as one-component systems. For the blocking it is possible in principle to use any blocking agent which can be used for the blocking of polyisocyanates and has a sufficiently low deblocking temperature. Such blocking agents are very familiar to the skilled worker. Preference is given to using blocking agents of the kind described in EP-A-0 626 888 and EP-A-0 692 007.

The Catalyst (D)

It is essential to the invention that the coating compositions of the invention comprise at least one catalyst (D) for the crosslinking of the silane groups. Examples are metal complexes with chelate ligands on the basis of zinc or aluminum, such as the titanates described in WO 05/03340, for example, or Lewis acids, but when selecting the catalysts it should be ensured that they do not lead to yellowing of the coating compositions. Furthermore, certain catalysts whose use is known are less desirable, for toxicological reasons.

It is therefore preferred to make use as catalyst (D) of phosphorus-containing catalysts, especially phosphorus-containing and nitrogen-containing catalysts. In this context it is also possible to use mixtures of two or more different catalysts (D).

Examples of suitable phosphorus-containing catalysts (D) are substituted phosphonic diesters and diphosphonic diesters, preferably from the group consisting of acyclic phosphonic diesters, cyclic phosphonic diesters, acyclic diphosphonic diesters, and cyclic diphosphonic diesters. Catalysts of this kind are described for example in German patent application DE-A-102005045228.

More particularly, however, use is made of substituted phosphoric monoesters and phosphoric diesters, preferably from the group consisting of acyclic phosphoric diesters and cyclic phosphoric diesters, more preferably amine adducts of the phosphoric acid monoesters and diesters. The acyclic phosphoric diesters (D) are selected more particularly from the group consisting of acyclic phosphoric diesters (D) of the general formula (IV):

(IV)

where the radicals $R_{10}$ and $R_{11}$ are selected from the group consisting of:
  substituted and unsubstituted alkyl having 1 to 20, preferably 2 to 16, and more particularly 2 to 10 carbon atoms, cycloalkyl having 3 to 20, preferably 3 to 16, and more particularly 3 to 10 carbon atoms, and aryl having 5 to 20, preferably 6 to 14, and more particularly 6 to 10 carbon atoms,
  substituted and unsubstituted alkylaryl, arylalkyl, alkylcycloalkyl, cycloalkylalkyl, arylcycloalkyl, cycloalkylaryl, alkylcycloalkylaryl, alkylarylcycloalkyl, arylcycloalkylalkyl, arylalkylcycloalkyl, cycloalkylalkylaryl, and cycloalkylarylalkyl, the alkyl, cycloalkyl, and aryl groups present therein each containing the aforementioned number of carbon atoms, and substituted or unsubstituted radical of the aforementioned kind, containing at least one, more particularly one, heteroatom selected from the group consisting of oxygen atom, sulfur atom, nitrogen atom, phosphorus atom, and silicon atom, more particularly oxygen atom, sulfur atom, and nitrogen atom, and being able additionally to be hydrogen as well (partial esterification).

With very particular preference use is made as catalyst (D) of the corresponding amine-blocked phosphoric esters, and more particularly here amine-blocked phosphoric acid ethylhexyl esters and amine-blocked phosphoric acid phenyl esters, especially amine-blocked bis(2-ethylhexyl) phosphate.

Examples of amines with which the phosphoric esters are blocked are, more particularly, tertiary amines, examples being bicyclic amines, such as diazabicyclooctane (DABCO), diazabicyclononene (DBN), diazabicycloundecene (DBU), dimethyldodecylamine or triethylamine. For blocking the phosphoric esters it is particularly preferred to use tertiary amines, which ensure high efficacy of the catalyst under the curing conditions of 140° C.

Certain amine-blocked phosphoric acid catalysts are also available commercially (e.g., Nacure products from King Industries). Mention may be made for example of Nacure 4167 from King Industries as a particularly suitable catalyst on the basis of an amine-blocked phosphoric acid partial ester.

The catalysts are used preferably in fractions of 0.01% to 20% by weight, more preferably in fractions of 0.1° i° to 10% by weight, based on the nonvolatile constituents of the coating composition of the invention. A relatively low catalyst efficacy can be compensated in part by correspondingly higher amounts employed.

The coating compositions of the invention may also comprise a further amine catalyst based on a bicyclic amine, more particularly on an unsaturated bicyclic amine. Examples of suitable amine catalysts are 1,5-diazabicyclo[4.3.0]non-5-ene or 1,8-diazabicyclo[5.4.0]undec-7-ene.

These amine catalysts are used preferably in fractions of 0.01% to 20% by weight, more preferably in fractions of 0.1% to 10% by weight, based on the nonvolatile constituents of the coating composition of the invention.

The Combination of Components A, B, Optionally C, and D and further Components of the Coating Composition The weight fraction of hydroxyl-containing polyesters (A) to be employed, based on the weight fraction of the isocyanato-containing compounds (B), is dependent on the hydroxy equivalent weight of the polyester and on the equivalent weight of the free isocyanate groups of the polyisocyanate.

In the coating composition of the invention there is preferably 2.5 to 97.5 mol %, based on the sum of structural units (I) and (II), of structural units (I) and 2.5 to 97.5 mol %, based on the sum of structural units (I) and (II), of structural units (II).

The coating compositions of the invention contain preferably between 2.5% and 97.5%, more preferably between 5% and 95%, very preferably between 10% and 90%, and in particular between 20% and 80%, by weight, based on the amount of nonvolatile substances in the coating composition, of the hydroxyl-containing polyester (A), and preferably between 2.5% and 97.5%, more preferably between 5% and 95%, very preferably between 10% and 90%, and in particular between 20% and 80%, by weight, based on the amount of nonvolatile substances in the coating composition, of the isocyanato compounds (B).

Based on the sum of the functional groups critical for crosslinking in the coating composition of the invention, formed from the fractions of the hydroxyl and isocyanate groups and also the fractions of the structural elements (I) and (II), the structural elements (I) and (II) are present preferably in fractions of 2.5 to 97.5 mol %, more preferably between 5 and 95 mol %, and very preferably between 10 and 90 mol %.

In order to ensure further-improved resistance properties on the part of the coatings of the invention toward cracking under UV radiation and wet/dry cycling in the CAM180 test (to DIN EN ISO 11341 February 98 and DIN EN ISO 4892-2 November 00) in combination with a high scratch resistance directly following the thermal cure, a high gloss, and high gloss retention after weathering, it is additionally preferred to select the level of structural units (I) and/or (II) to be at most such that the coating compositions of the invention contain less than 6.5% by mass of Si of the structural units (I) and/or (II), very preferably not more than 6.0% by mass of Si of the structural units (I) and/or (II), based in each case on the solids content of the coating compositions. The silane content in % by mass of Si is determined arithmetically from the amounts of the compounds (Ia) and (IIa) that are used.

The weight fractions of the polyester (A), of the compound (C), and of the polyisocyanate (B) are preferably selected such that the molar equivalent ratio of the unreacted isocyanate groups of the isocyanate-containing compounds (B) to the hydroxyl groups of the polyester (A) and the optionally used compound (C) is between 0.9:1.0 and 1.2:1.0, preferably between 0.95:1.0 and 1.1:1.0, more preferably between 0.98:1.0 and 1.05:1.0.

Where the compositions are one-component coating compositions, a selection is made of the isocyanato compounds (B) whose free isocyanate groups have been blocked with the blocking agents described above.

In the case of the inventively preferred 2-component (2K) coating compositions, a coating component comprising the hydroxyl-containing polyester (A), optionally (C), and also further components, described below, is mixed conventionally with a further coating component, comprising the isocyanato compound (B) and, where appropriate, further of the components described below, this mixing taking place shortly before the coating composition is applied; generally speaking, the coating component that comprises the compound (A) comprises the catalyst and also part of the solvent.

Solvents suitable for the coating compositions of the invention are in particular those which, in the coating composition, are chemically inert toward the compounds (A), (B), and optionally (C) and also do not react with (A) and (B) when the coating composition is being cured. Examples of such solvents are aliphatic and/or aromatic hydrocarbons such as toluene, xylene, solvent naphtha, Solvesso 100 or Hydrosol® (from ARAL), ketones, such as acetone, methyl ethyl ketone or methyl amyl ketone, esters, such as ethyl acetate, butyl acetate, pentyl acetate or ethyl ethoxypropionate, ethers, or mixtures of the aforementioned solvents. The aprotic solvents or solvent mixtures preferably have a water content of not more than 1%, more preferably not more than 0.5%, by weight, based on the solvent. In order to ensure a good appearance, use is made in particular of a high fraction of butyl acetate as solvent, more preferably at least 60% by weight of butyl acetate, based on the total weight of the solvent mixture. Further solvents are employed in order to adjust the correspondingly desired evaporation numbers.

Besides the compounds (A), (B), and (C) it is possible additionally to use further binders (E), which preferably are able to react and form network points with the hydroxyl groups of the polyester (A) and/or with the free isocyanate groups of the compound (B) and/or with the alkoxysilyl groups of the compounds (B) and/or (C).

By way of example it is possible to use amino resins and/or epoxy resins as component (E). Suitable amino resins are the typical, known amino resins, some of whose methylol and/or methoxymethyl groups may have been defunctionalized by means of carbamate or allophanate groups. Crosslinking agents of this kind are described in patents U.S. Pat. No. 4,710,542 and EP-B-0 245 700 and also in the article by B. Singh and coworkers, "Carbamylmethylated Melamines, Novel Crosslinkers for the Coatings Industry" in Advanced Organic Coatings Science and Technology Series, 1991, volume 13, pages 193 to 207.

Generally speaking, such components (E) are used in fractions of up to 40%, preferably up to 30%, more preferably up to 25%, by weight, based on the nonvolatile constituents of the coating composition.

The coating composition of the invention may further comprise at least one typical, known coatings additive (F) in effective amounts, i.e., in amounts preferably up to 30%, more preferably up to 25%, and in particular up to 20% by weight, in each case based on the nonvolatile constituents of the coating composition.

Examples of suitable coatings additives are:
particularly UV absorbers;
particularly light stabilizers such as HALS compounds, benzotriazoles or oxalanilides;
free-radical scavengers;
slip additives;
polymerization inhibitors;
defoamers;
reactive diluents, of the kind which are common knowledge from the prior art, and which are preferably inert toward the —Si(OR)3 groups;
wetting agents such as siloxanes, fluorine compounds, carboxylic monoesters, phosphoric esters, polyacrylic acids and their copolymers, or polyurethanes;
adhesion promoters such as tricyclodecanedimethanol;
flow control agents;
film-forming assistants such as cellulose derivatives;
fillers such as, for example, nanoparticles based on silicon dioxide, aluminum oxide or zirconium oxide; for further details refer to Römpp Lexikon "Lacke and Druckfarben" Georg Thieme Verlag, Stuttgart, 1998, pages 250 to 252;
rheology control additives, such as the additives known from patents WO 94/22968, EP-A-0 276 501, EP-A-0 249 201 or WO 97/12945; crosslinked polymeric microparticles, as disclosed for example in EP-A-0 008 127; inorganic phyllosilicates such as aluminum-magnesium silicates, sodium-magnesium and sodium-magnesium-fluorine-lithium phyllosilicates of the montmorillonite type; silicas such as Aerosils®; or synthetic polymers containing ionic and/or associative groups such as polyvinyl alcohol, poly(meth)acrylamide, poly(meth)acrylic acid, polyvinylpyrrolidone, styrene-maleic anhydride copolymers or ethylene-maleic anhydride copolymers and their derivatives, or hydrophobically modified ethoxylated urethanes or polyacrylates;
flame retardants and/or,
the water scavengers already listed above.

In a further embodiment of the invention the coating composition of the invention may additionally comprise further pigments and/or fillers and may serve for producing pigmented topcoats. The pigments and/or fillers employed for this purpose are known to the skilled worker.

Because the coatings of the invention produced from the coating compositions of the invention adhere excellently even to electrocoats, surfacer coats, basecoat systems or typical, known clearcoat systems that have already cured, they are outstandingly suitable not only for use in automotive OEM finishing but also for automotive refinish or for the modular scratchproofing of automobile bodies that have already been painted.

The coating compositions of the invention can be applied by any of the typical application methods, such as spraying, knife coating, spreading, pouring, dipping, impregnating, trickling or rolling, for example. In the course of such application, the substrate to be coated may itself be at rest, with the application equipment or unit being moved. Alternatively the substrate to be coated, in particular a coil, may be moved, with the application unit at rest relative to the substrate or being moved appropriately.

Preference is given to employing spray application methods, such as compressed-air spraying, airless spraying, high-speed rotation, electrostatic spray application (ESTA), alone or in conjunction with hot spray application such as hot-air spraying, for example.

The applied coating compositions of the invention can be cured after a certain rest time. The rest time serves, for example, for the leveling and devolatilization of the coating films or for the evaporation of volatile constituents such as solvents. The rest time may be assisted and/or shortened by the application of elevated temperatures and/or by a reduced humidity, provided this does not entail any damage or alteration to the coating films, such as premature complete crosslinking, for instance.

The thermal curing of the coating compositions has no peculiarities in terms of method but instead takes place in accordance with the typical, known methods such as heating in a forced-air oven or irradiation with IR lamps. The thermal cure may also take place in stages. Another preferred curing method is that of curing with near infrared (NIR) radiation.

The thermal cure takes place advantageously at a temperature of 30 to 200° C., more preferably 40 to 190° C., and in particular 50 to 180° C. for a time of 1 min up to 10 h, more preferably 2 min up to 5 h, and in particular 3 min to 3 h, although longer cure times may be employed in the case of the temperatures that are employed for automotive refinish, which are preferably between 30 and 90° C.

The coating compositions of the invention produce new cured coatings, especially coating systems, more particularly clearcoat systems; moldings, especially optical moldings; and self-supporting films, all of which are highly scratchproof and in particular are stable to chemicals and to weathering, and have a very good overall appearance. The coatings and coating systems of the invention, especially the clearcoat systems, can in particular be produced even in film thicknesses >40 μm without stress cracks occurring.

For these reasons the coating compositions of the invention are of excellent suitability as decorative, protective and/or effect-imparting, highly scratchproof coatings and coating systems on bodies of means of transport (especially motor vehicles, such as motor cycles, buses, trucks or automobiles) or parts thereof; on buildings, both interior and exterior; on furniture, windows, and doors; on plastics moldings, especially CDs and windows; on small industrial parts, on coils, containers, and packaging; on white goods; on films; on optical, electrical, and mechanical components; and on hollow glassware and articles of everyday use.

The coating compositions and coating systems of the invention, especially the clearcoat systems, are employed in particular in the technologically and esthetically particularly demanding field of automotive OEM finishing and also of automotive refinish. With particular preference the coating compositions of the invention are used in multistage coating methods, particularly in methods where a pigmented basecoat film is first applied to an uncoated or precoated substrate and thereafter a film with the coating compositions of the invention is applied. The invention, accordingly, also provides multicoat effect and/or color coating systems comprising at least one pigmented basecoat and at least one clearcoat disposed thereon, wherein the clearcoat has been produced from the coating composition of the invention.

Not only water-thinnable basecoat materials but also basecoat materials based on organic solvents can be used. Suitable basecoat materials are described for example in EP-A-0 692 007 and in the documents cited there in column 3 lines 50 et seq. The applied basecoat material is preferably first dried, i.e., at least some of the organic solvent and/or water is stripped from the basecoat film in an evaporation phase. Drying is accomplished preferably at temperatures from room temperature to 80° C. Drying is followed by the application of the coating composition of the invention. Subsequently the two-coat system is baked, preferably under conditions employed for automotive OEM finishing, at temperatures from 30 to 200° C., more preferably 40 to 190° C., and in particular 50 to 180° C., for a time of 1 min up to 10 h, more preferably 2 min up to 5 h, and in particular 3 min to 3 h, although longer cure times may also be employed at the temperatures employed for automotive refinish, which are preferably between 30 and 90° C.

The coats produced with the coating composition of the invention are notable in particular for an especially high chemical stability and weathering stability and also for a very good carwash resistance and scratchproofing, and at the same time exhibit very good overall appearance.

In a further preferred embodiment of the invention, the coating composition of the invention is used as a transparent clearcoat material for coating plastics substrates, especially transparent plastics substrates. In this case the coating compositions include UV absorbers, which in terms of amount and type are also designed for effective UV protection of the plastics substrate. Here as well, the coating compositions are notable for an outstanding combination of scratchproofing and weathering stability with at the same time very good appearance. The plastics substrates thus coated are used preferably as a substitute for glass components in automobile construction, the plastics substrates being composed preferably of polymethyl methacrylate or polycarbonate.

EXAMPLES

Preparation of the Inventive Polyester Polyol A1

In a reactor provided with a stirrer, reflux condenser, and water separator, 1215.4 parts by weight of isononanoic acid are introduced and 140 parts by weight of xylene are added. The mixture is heated cautiously with stirring to 80° C. Then 2284.6 parts by weight of a dendritic hydroxy-functional polyester (Boltorn H 30, available from Perstorp) are added slowly in order to prevent lumps forming. Following the addition the reaction mixture is heated to 200° C. For monitoring the course of the reaction, the volume of condensate is recorded and from time to time a sample is taken for determination of the hydroxyl number. When the amount of condensate calculated beforehand as corresponding to complete conversion has been reached, the xylene fraction is removed by distillation. The reaction mixture is stirred at 200° C. until an acid number of less than 5 mg KOH/g (determined in accordance with DIN 53402) is reached. The mixture is cooled to 145° C. and dissolved in 840 parts by weight of butyl acetate.

The resulting polyester resin has a solid fraction of 78.8% by weight. The resulting hydroxyl number is 190 mg KOH/g (determined in accordance with DIN 53240), the acid number 5.8 mg KOH/g (DIN 53402).

Preparation of the Inventive Polyester Polyol A2

In a reactor provided with a stirrer, reflux condenser, and water separator, 866.29 parts by weight of isononanoic acid are introduced and 98.57 parts by weight of xylene are added. The mixture is heated cautiously with stirring to 80° C. Then 2133.71 parts by weight of a dendritic hydroxy-functional polyester (Boltorn H 30, available from Perstorp) are added slowly in order to prevent lumps forming. Following the addition the reaction mixture is heated to 200° C. For monitoring the course of the reaction, the volume of condensate is recorded and from time to time a sample is taken for determination of the hydroxyl number. When the amount of condensate calculated beforehand as corresponding to complete conversion has been reached, the xylene fraction is removed by distillation. The reaction mixture is stirred at 200° C. until an acid number of less than 5 mg KOH/g (determined in accordance with DIN 53402) is reached. The mixture is cooled to 145° C. and dissolved in 725.36 parts by weight of butyl acetate.

The resulting polyester resin has a solid fraction of 79.8% by weight. The resulting hydroxyl number is 248.0 mg KOH/g (determined in accordance with DIN 53240), the acid number 5.9 mg KOH/g (DIN 53402).

Preparation of the Inventive Polyester Polyol A3

In a reactor provided with a stirrer, reflux condenser, and water separator, 727.27 parts by weight of isononanoic acid are introduced and 82.75 parts by weight of xylene are added. The mixture is heated cautiously with stirring to 80° C. Then 2272.73 parts by weight of a dendritic hydroxy-functional polyester (Boltorn H 30, available from Perstorp) are added slowly in order to prevent lumps forming. Following the addition the reaction mixture is heated to 200° C. For monitoring the course of the reaction, the volume of condensate is recorded and from time to time a sample is taken for determination of the hydroxyl number. When the amount of condensate calculated beforehand as corresponding to complete conversion has been reached, the xylene fraction is removed by distillation. The reaction mixture is stirred at 200° C. until an acid number of is less than 5 mg KOH/g (determined in accordance with DIN 53402) is reached. The mixture is cooled to 145° C. and dissolved in 729.31 parts by weight of butyl acetate.

The resulting polyester resin has a solid fraction of 78.5% by weight. The resulting hydroxyl number is 281 mg KOH/g (determined in accordance with DIN 53240), the acid number 6.1 mg KOH/g (DIN 53402).

Preparation of the Inventive Polyester Polyol A4

In a reactor provided with a stirrer, reflux condenser, and water separator, 2700.0 parts by weight of isononanoic acid are introduced and 134.62 parts by weight of xylene are added. The mixture is heated cautiously with stirring to 80° C.

Then 1516.85 parts by weight of a dendritic hydroxy-functional polyester (Boltorn H 30, available from Perstorp) are added slowly in order to prevent lumps forming. Following the addition the reaction mixture is heated to 200° C. For monitoring the course of the reaction, the volume of condensate is recorded and from time to time a sample is taken for determination of the hydroxyl number. When the amount of condensate calculated beforehand as corresponding to complete conversion has been reached, the xylene fraction is removed by distillation. The reaction mixture is stirred at 200° C. until an acid number of less than 5 mg KOH/g (determined in accordance with DIN 53402) is reached. The mixture is cooled to 145° C. and dissolved in 641.35 parts by weight of pentyl acetate.

The resulting polyester resin has a solid fraction of 79.3% by weight. The resulting hydroxyl number is 130.91 mg KOH/g (determined in accordance with DIN 53240), the acid number 6.4 mg KOH/g (DIN 53402).

Preparation of a Hydroxyl-Containing Acrylate Resin (PAC C1)

A reactor flushed with nitrogen and fitted with a condenser is charged with 759.61 parts by weight of solvent naphtha and this initial charge is heated to 145° C. with stirring.

In parallel to this, two separate feeds were prepared. Feed 1 consisted of 457.60 parts by weight of ethylhexyl methacrylate, 213.54 parts by weight of styrene, 183.04 parts by weight of n-butyl methacrylate, 183.04 parts by weight of 2-hydroxyethyl acrylate, 457.60 parts by weight of 4-hydroxybutyl acrylate, and 30.50 parts by weight of acrylic acid.

Feed 2 consisted of 62.54 parts by weight of solvent naphtha and 152.53 parts by weight of peroxide TBPEH (tert-butyl peroxy-2-ethylhexanoate). When the temperature of 145° C. was reached, feed 2 was metered in slowly and uniformly over a time of 285 minutes. 15 minutes after the start of feed 2, feed 1 was metered slowly and uniformly into the reactor over a time of 240 minutes. After the end of the metering of feed 2, the reaction mixture was stirred at 145° C. for a further 120 minutes for post-polymerization.

The solids content of the resultant product was found to be 65.65%, its acid number 15.5 mg KOH/g (based on the solids), and its viscosity (at 23° C.) 21 dPa s. The OH number was found to be 174.7 mg KOH/g.

Preparation of a Rheological Assistant F1 Based on Ureas

A 5 l Juvo reaction vessel with heating mantle, thermometer, stirrer, and melted condenser was charged with 875.7 g of an aromatic solvent. With stirring and under an inert gas atmosphere (200 cm3/min nitrogen), the aromatic solvent was heated to 160° C. under superatmospheric pressure (max. 3.5 bar). Using a measuring pump, a mixture of 37.5 g of di-tert-butyl peroxide and 138.6 g of an aromatic solvent was added dropwise at a uniform rate over the course of 4.75 h. 0.25 h after the beginning of the addition, a measuring pump was used to add 848.4 g of styrene, 600.0 g of n-butyl acrylate, 418.2 g of hydroxyethyl acrylate, and 38.4 g of methacrylic acid at a uniform rate over the course of 4 h. After the end of the addition, the temperature was maintained for 2 h and then the product was cooled to 60° C. and filtered through a 5 μm GAF bag. The resulting resin had an acid number of 15 mg KOH/g (to DIN 53402), a solids content of 65%+/−1 (60 min, 130° C.), and a viscosity of 8.5 dPa*s according to the experimental specification of DIN ISO 2884-1 (55% in solvent naphtha).

A 1 l reactor was charged with 423.5 g of the resin solution and this initial charge was diluted with 29.4 g of butyl acetate. Thereafter 11.2 g of benzylamine were added and the mixture was stirred for 30 min. After this time, with application of high shearing forces, a mixture of 8.8 g of hexamethylene diisocyanate and 17.1 g of butyl acetate was added in such a way that a reaction temperature of 40° C. was not exceeded. The resulting mixture had a viscosity of >800 mPas (10 s-1) (Z3) (DIN ISO 2884-1) and a solids content of 59.0% (60 min, 130° C.).

Preparation of a Further Rheology Additive F2

A 5 l reactor flushed with nitrogen and fitted with a condenser is charged with 924.00 parts by weight of solvent naphtha and this initial charge is heated to 140° C. with stirring.

In parallel with this, two separate feeds were prepared. Feed 1 consisted of 338.10 parts by weight of styrene, 253.50 parts by weight of n-butyl methacrylate, 338.10 parts by weight of 2-hydroxypropyl methacrylate, 16.80 parts by weight of acrylic acid, 439.50 parts by weight of cyclohexyl methacrylate, and 304.20 parts by weight of 2-hydroxyethyl methacrylate.

Feed 2 consisted of 60.00 parts by weight of solvent naphtha and 168.90 parts by weight of peroxide TBPEH (tert-butyl peroxy-2-ethyl-hexanoate). After the temperature of 140° C. was reached, feed 2 was metered in slowly and uniformly over a time of 285 minutes. 15 minutes after the start of feed 2, feed 1 was metered slowly and uniformly into the reactor over a time of 240 minutes. After the end of the metering of feed 2, the reaction mixture was stirred at 140° C. for 120 minutes more for post-polymerization. The solids was adjusted with 179.40 g of solvent naphtha.

The solids content of the resultant product was found to be 60.00%, its acid number 9.00 mg KOH/g (based on the solids), and its viscosity (at 23° C., 55% strength in solvent naphtha) 2000 mPa s ($2500\ s^{-1}$) (CAP03) (DIN ISO 2884-1). The OH number was found to be 155.6 mg KOH/g.

75 parts by weight of the resulting polyacrylate polyol were diluted in 16.3 parts by weight of butyl acetate. Added to this mixture were 8.7 parts by weight of Aerosil® 380 (commercial hydrophilic silica with an average primary particle size of 7 nm and a specific BET surface area of 380 $m^2/g$, from Evonik). Afterward the resulting mixture was homogenized in a dissolver (VDH-1 from Vollrath, peripheral speed 8-28 m/s) at a temperature of 60° C. Finally the mixture was ground in a stirred mill (model ZWM 46, grinding media 0.6-0.8 mm, type ER 120 A, filling level 85) with an energy input of 0.18 kWh per kg of grinding charge and a maximum paste temperature of 60° C. The resulting paste was used as a rheology assistant.

Preparation of a Phosphorus-Containing, Amine-Blocked Catalyst (D)

A 500 ml glass flask is charged with 42.5 g of hexanol and 167.3 g of diazabicyclooctane (DABCO); the mixture is stirred under a nitrogen atmosphere with reflux cooling, heated to 44° C., and maintained until the DABCO has dissolved. Subsequently 45.78 g of di(2-ethylhexyl)-phosphoric acid (commercial product: Baysolvex D2EHPA from Lanxess) are added slowly dropwise in such a way that 50° C. is not exceeded. After the end of the addition the product is held at 40° C. for 3 h. Subsequently the product is diluted with 93.75 g of butyl acetate and 51.2 g of hexanol.

Preparation of the Inventive Partly Silanized Polyisocyanate I1 (Degree of Conversion of the Isocyanate Groups=40 mol %)

A round-bottomed flask with a reflux condenser was charged with 36.296 parts by weight of trimerized hexamethylene diisocyanate (commercial product Basonat HI 100 from BASF SE, Ludwigshafen), 36.093 parts by weight of butyl acetate, and 2.458 parts by weight of triethyl orthoformate. 1.786 parts by weight of N-(3-trimethoxysilylpropan-1-yl)-N-n-butylamine (commercial product: Dynasilan 1189 from Evonik) and 23.367 parts by weight of N,N-bis(3-trimethoxysilylpropan-1-yl)amine (commercial product Dynasilan 1124 from Evonik) were premixed and metered in slowly at room temperature, under reflux and with nitrogen blanketing, in such a way that the product temperature does not exceed 60° C. Subsequently the reaction mixture was heated to 60° C. and held until the residual NCO content had reached 4.9% (NCO determination by titration).

Formulation of the Coating Compositions and Production of the Coatings

The coating compositions of inventive examples 1 to 5 and of comparative examples 1 and 2 were formulated as follows:

component 1, containing component A (polyol) and commercial additives and catalyst and solvent, is combined shortly before application with component 2, containing component I1 (modified polyisocyanate), and the mixture is stirred until homogeneous.

Table 1 lists the coating compositions of inventive example 1 and of comparative example 1 in terms of the proportions of the components:

TABLE 1

Composition of the clearcoat materials of inventive example 1 and of comparative example 1, in parts by weight

|  | Inventive example 1 | Comparative example 1 |
| --- | --- | --- |
| Acrylate (PAC C1) |  | 36.60 |
| Polyester A1 | 36.60 |  |
| Rheology assistant F1 | 21.00 | 21.00 |
| Additive F2 | 12.30 | 12.30 |
| Butyl acetate | 14.70 | 14.70 |
| Butyldiglycol acetate | 2.10 | 2.10 |
| Triethyl orthoformate | 3.15 | 3.15 |
| Flow control agent F3 [1] | 0.20 | 0.20 |
| Tinuvin 384-2 [2] | 1.60 | 1.60 |
| Tinuvin 152, 50% in SN [3] | 2.75 | 2.75 |
| Catalyst D1 | 5.60 | 5.60 |
| Total | 100.00 | 100.00 |
| Isocyanate curing agent I1 | 113.5 | 96.6 |

Key to Table 1:
[1] commercial, polyester-based flow control agent
[2] commercial light stabilizer based on a benzotriazole, from Ciba
[3] commercial light stabilizer based on a sterically hindered amine, from Ciba Table 2 lists the coating compositions of inventive examples 2 to 5 and of comparative example 2 in terms of the proportions of the components. The respective millbases were adjusted by addition of solvent naphtha to a flow time of 33 seconds in the DIN 4 cup.

TABLE 2

Composition of the clearcoat materials of inventive examples 2 to 5 and of comparative example 2, in parts by weight

|  | Comparative example 2 | Inventive example 2 | Inventive example 3 | Inventive example 4 | Inventive example 5 |
| --- | --- | --- | --- | --- | --- |
| Acrylate (PAC C1) | 48.50 |  |  |  |  |
| Polyester A1 |  | 47.06 |  |  |  |
| Polyester A2 |  |  | 45.48 |  |  |
| Polyester A3 |  |  |  | 41.13 |  |
| Polyester A4 |  |  |  |  | 48.65 |
| Rheology assistant F1 | 18.35 | 17.85 | 17.25 | 15.60 | 18.11 |
| Solvent naphtha | 19.00 | 21.37 | 24.00 | 31.20 | 19.07 |
| Triethyl orthoformate | 3.70 | 3.57 | 3.45 | 3.21 | 3.69 |
| Flow control agent F4 [1] | 0.50 | 0.38 | 0.37 | 0.33 | 0.39 |
| Tinuvin 384 [2] | 1.90 | 1.81 | 1.75 | 1.58 | 1.87 |
| Tinuvin 292 [3] | 1.60 | 1.55 | 1.50 | 1.35 | 1.60 |
| Nacure 4167 [4] | 6.35 | 6.31 | 6.10 | 5.50 | 6.52 |
| DBN solution (30% in butanol) [5] | 0.10 | 0.10 | 0.10 | 0.10 | 0.10 |
| Total | 100.00 | 100.00 | 100.00 | 100.00 | 100.00 |
| Isocyanate curing agent I1 | 103.7 | 138.7 | 162.0 | 168.0 | 95.1 |

Key to Table 2:
[1] commercial flow control agent based on a polyether-modified polydimethylsiloxane
[2] commercial light stabilizer based on a benzotriazole, from Ciba
[3] commercial light stabilizer based on a sterically hindered amine, from Ciba
[4] commercial catalyst from King Industries, based on an amine-blocked phosphoric acid partial ester
[5] DBN = 1,5-diazabicyclo[4.3.0]non-5-ene Production and Testing of Coatings The overall appearance was assessed following pneumatic application of the coating compositions at 2.5 bar in three spray passes either to a commercial solid-color black waterborne basecoat from BASF Coatings AG or to a commercial silver metallic waterborne basecoat from BASF Coatings AG. Thereafter the resulting coating in each case is flashed off at room temperature for 5 minutes and then baked at 140° C. for 22 minutes.

The baked coating films of inventive example 1 and of comparative example 1 were investigated by means of the "Wave Scan" instrument from Byk-Gardner, with 1250 measurement points being recorded over a distance of 10 cm. The instrument divides the reflection into a longwave component ("long wave"=LW), i.e., the variance in the light intensity for structures in the range from 0.6 mm to 10 mm, and a shortwave component ("short wave"=SW), i.e., the variance in the light intensity of the structures in the range from 0.1 mm to 0.6 mm. The results of the Wave Scan measurements are shown in table 3 and table 4. Additionally to the evaluation of appearance, a run test was carried out on the solid-color black basecoat. In the context of that test it was found that both clearcoat materials have a run limit of >50 µm.

TABLE 3 results of the Wave Scan measurements of the cured coatings over the solid-color black waterborne basecoat:

| Material | Clearcoat film thickness [µm] | LW | SW |
| --- | --- | --- | --- |
| Inventive | 20-25 µm | 24 | 28 |

TABLE 3-continued results of the Wave Scan measurements of the cured coatings
over the solid-color black waterborne basecoat:

| Material | Clearcoat film thickness [μm] | LW | SW |
|---|---|---|---|
| example 1 | 25-30 μm | 18 | 25 |
|  | 30-35 μm | 17 | 26 |
|  | 35-40 μm | 15 | 27 |
|  | 40-45 μm | 12 | 28 |
| Comparative example C1 | 20-25 μm | 30 | 35 |
|  | 25-30 μm | 25 | 32 |
|  | 30-35 μm | 21 | 34 |
|  | 35-40 μm | 16 | 38 |
|  | 40-45 μm | 15 | 41 |

TABLE 4 results of the Wave Scan measurements of the cured coatings
over the silver metallic waterborne basecoat:

| Material | Clearcoat film thickness [μm] | LW | SW |
|---|---|---|---|
| Inventive example 1 | 20-25 μm | 18 | 23 |
|  | 25-30 μm | 16 | 22 |
|  | 30-35 μm | 14 | 24 |
|  | 35-40 μm | 12 | 25 |
|  | 40-45 μm | 11 | 27 |
| Comparative example C1 | 20-25 μm | 21 | 29 |
|  | 25-30 μm | 19 | 29 |
|  | 30-35 μm | 17 | 33 |
|  | 35-40 μm | 14 | 35 |
|  | 40-45 μm | 13 | 37 |

The results show that, in the case both of application to the black basecoat and of application to the metallic silver basecoat, the coating of inventive example 1, produced using the inventive coating composition, always exhibits lower long wave values and lower short wave values than the coating of comparative example C1, using the noninventive coating composition based on an acrylate polyol. In particular, the long wave values LW, which are critical for a good visual impression, in combination with very low film thicknesses, are much lower in the inventive example 1 than the corresponding long wave values LW of the resulting coating of the comparative example C1.

On the resulting coatings on the solid-color black waterborne basecoat, additionally, the scratch resistance of the surfaces was tested by means of the Crockmeter test [based on EN ISO 105-X12 with 10 double rubs and an applied force of 9 N, using 9 μm polishing paper (3M 281Q Wetordry™ Production™), with subsequent determination of the residual gloss at 20° using a commercial gloss instrument] and by means of the hammer test [10 or 100 double rubs with steel wool (RAKSO®00 (fine)) and an applied weight of 1 kg, carried out with a hammer, with subsequent determination of the residual gloss at 20° C. using a commercial gloss instrument]. The results are shown in Table 5 below.

TABLE 5

Results of the testing of dry scratch resistance by means of the
Crockmeter and the hammer test

| Test | Residual gloss [%] inventive example 1 | Residual gloss [%] Comparative example C1 |
|---|---|---|
| Crockmeter 9 μm paper, 10 double rubs | 91 | 93 |
| Hammer test 10 double rubs | 96 | 91 |
| Hammer test 100 double rubs | 94 | 88 |

From the results it is apparent that the coating of inventive example 1 and that of comparative example C1 exhibit very good comparable scratch resistance in both tests. In accordance with the invention, therefore, an improvement is obtained in appearance without detriment to the mechanical properties.

The coating compositions of inventive examples 2 to 5 and of comparative example 2 were applied pneumatically at 2.5 bar in three spray passes to a commercial solid-color black waterborne basecoat from BASF Coatings AG. Thereafter the resulting coating is in each case flashed off at room temperature for 5 minutes and then baked at 140° C. for 22 minutes. The appearance of the resulting coatings was assessed visually. Additionally, on the resulting coatings, the micropenetration hardness was tested in accordance with DIN 55676 using the Fischerscope instrument from Helmut Fischer GmbH & Co, with a maximum force of 30 mN, and the scratch resistance of the surfaces was tested by means of the hammer test [10 or 100 double rubs with steel wool (RAKSO®00 (fine)) and with an applied weight of 1 kg, carried out with a hammer, and with subsequent determination of the residual gloss at 20° using a commercial gloss instrument]. The results are shown in Table 6 below:

TABLE 6

Results of the testing of appearance, micropenetration hardness,
and dry scratch resistance by means of the hammer test

| | Appearance-visual assessment | Micro-penetration hardness 30 mN [N/mm2] | Hammer test residual gloss after 10 DH [%] | Hammer test residual gloss after 100 DH [%] |
|---|---|---|---|---|
| Comparative example 2 | strongly pronounced shortwave | 107.5 | 92.7 | 87.5 |
| Inventive example 2 | ok | 110.2 | 96.8 | 95.5 |
| Inventive example 3 | ok | 114.4 | 98.7 | 96.6 |
| Inventive example 4 | ok | 117.3 | 98.7 | 98.0 |
| Inventive example 6 | visible shortwave, but less strongly pronounced than in comparative example 2 | 84.96 | 92.5 | 85.1 |

The results show that the use of polyesters having a relatively low OH number leads to coatings with a poorer appearance and a poorer scratch resistance than the use of polyesters with very high OH numbers. With particular preference, therefore, polyesters with an OH number of at least 180 mg KOH/g are employed.

What is claimed is:

1. A coating composition based on aprotic solvents, comprising (a) at least one hydroxyl-containing compound (A),
(b) at least one saturated compound (B) having free and/or blocked isocyanate groups and containing at least in part hydrolyzable silane groups, and
(c) at least one catalyst (D) for the crosslinking of silane groups,
wherein the coating composition comprises as hydroxyl-containing compound (A) at least one hyperbranched, dendritic hydroxy-functional polyester in which on average at least one hydroxyl function of the polyester is esterified with at least one acid selected from the group of the isomeric C8 to C9 monocarboxylic acids.

2. The coating composition as claimed in claim 1, wherein the monocarboxylic acid is saturated or wherein the monocarboxylic acid is octanoic acid or isononanoic acid.

3. The coating composition as claimed in claim 1, wherein the coating composition comprises as hydroxyl-containing compound (A) at least one hyperbranched, dendritic hydroxy-functional polyester having an OH number ≧180 mg KOH/g measured via DIN 53240.

4. The coating composition as claimed in claim 1, wherein the polyester has a hydroxyl number of >180 mg KOH/g, determined in accordance with DIN 53240, and/or a hydroxy functionality (given via the number of free and of esterified hydroxyl groups of the hydroxy-functional polyester) of greater than 16.

5. The coating composition as claimed in claim 1, wherein the polyester has an acid number ≦8.0, determined in accordance with DIN 53402, and/or wherein the polyester has a number-average molecular weight of 1500-4000 g/mol, determined via GPC with a polystyrene standard in THF with 0.1% by weight of acetic acid.

6. The coating composition as claimed in claim 1, wherein the polyester has a polydispersity Mw/Mn<4.

7. The coating composition as claimed in claim 1, comprising as solvent butyl acetate or a solvent mixture comprising butyl acetate.

8. The coating composition as claimed in claim 1, wherein the polyester is prepared via a partial esterification of a hydroxy-functional polyester prepared in turn via a method for the synthesis of a dendritic polymeric polyfunctional polyalcohol having reactive and, optionally, protected hydroxyl end groups,
where the polymeric polyalcohol possesses n dendritic branches originating from a monomeric or polymeric initiator molecule having n reactive groups (A1), each branch comprising g branching generations, each generation comprising at least one polymeric or monomeric branching chain extender having three functional groups, of which at least two are reactive hydroxyl groups (A2) and one is a carboxyl group (A3) which is reactive with the reactive group (A1) and/or with the hydroxyl groups (A2), and, optionally, at least one spacer generation which comprises at least one spacer chain extender having two functional groups, of which one is a protected hydroxyl group (A2") and one is a group (A4) which is reactive with a hydroxyl group, with n and g being whole numbers and being at least 1,
where (i) the two hydroxyl groups (A2) of the monomeric or polymeric chain branching extender used are acetal-protected hydroxyl groups (A2'), the protection by acetal being obtained through a reaction between the two hydroxyl groups (A2) and an acetal-forming carbonyl compound; and
(ii) where a first branching generation is added to the initiator molecule through reaction between the reactive group (A1) and the carboxyl group (A3), in a molar ratio of the reactive groups (A1) to the carboxyl groups (A3) of at least 1, to give a polymeric polyalcohol having acetal-protected hydroxyl groups (A2') and n dendritic branches which comprise one generation, the acetal-protected hydroxyl groups (A2') being optionally deprotected by means of acetal cleavage, to give a polymeric polyalcohol having reactive hydroxyl groups (A2); and
(iii) where further branching generations are added in g−1 repeated steps, through reaction between reactive hydroxyl groups (A2), obtained by deprotection by means of acetal cleavage, and carboxyl groups (A3), in a molar ratio of hydroxyl groups (A2) to carboxyl groups (A3) of at least 1, to give a polymeric polyalcohol having acetal-protected hydroxyl groups (A2') and n dendritic branches which comprise two or more generations, the acetal-protected hydroxyl groups (A2') being optionally deprotected by means of acetal cleavage, to give a polymeric polyalcohol having reactive hydroxyl groups (A2), and
optionally, (iv) step (ii) and/or each repetition of step (iii) individually is followed by
(a) a partial protection of available reactive hydroxyl groups (A2), giving a polymeric polyalcohol having at least one reactive hydroxyl group (A2) for use in step (iii) or in a repeated step (ii), and/or
(b) the addition of the optional spacer chain extender, which addition, following deprotection of the protected hydroxyl group (A2"), produces a polymeric polyalcohol having reactive hydroxyl groups (A2) for use in step (iii) or in a repeated step (iii) and n dendritic branches which comprise one or more branching generations, and at least one spacer generation is at least a sub-generation.

9. The coating composition as claimed in claim 1, wherein the catalyst (D) is phosphorus-containing and/or wherein the catalyst (D) or the catalysts (D) is or are selected from the group of substituted phosphonic diesters and/or diphosphonic diesters, substituted phosphoric monoesters and/or phosphoric diesters, and/or the corresponding amine-blocked phosphoric esters.

10. The coating composition as claimed in claim 1, wherein the compound (B) comprises
between 2.5 and 97.5 mol %, based on the entirety of structural units (I) and (II), of at least one structural unit of the formula (I)

$$-N(X-SiR''_x(OR')_{3-x})_n(X'-SiR''_y(OR')_{3-y})_m \quad (I)$$

where
R'=hydrogen, alkyl or cycloalkyl, it being possible for the carbon chain to be interrupted by nonadjacent oxygen, sulfur or NRa groups, with Ra=alkyl, cycloalkyl, aryl or aralkyl,
X,X'=linear and/or branched alkylene or cycloalkylene radical having 1 to 20 carbon atoms,
R"=alkyl, cycloalkyl, aryl, or aralkyl, it being possible for the carbon chain to be interrupted by nonadjacent oxygen, sulfur or NRa groups, with Ra=alkyl, cycloalkyl, aryl or aralkyl,
n=0 to 2, m=0 to 2, m+n=2, and
x, y=0 to 2,
and
between 2.5 and 97.5 mol %, based on the entirety of structural units (I) and (II), of at least one structural unit of the formula (II)

$$-Z-(X-SiR''_x(OR')_{3-x}) \quad (II),$$

where
Z=—NH—, —NR—, —O—, with

R=alkyl, cycloalkyl, aryl or aralkyl, it being possible for the carbon chain to be interrupted by nonadjacent oxygen, sulfur or NRa groups, with Ra=alkyl, cycloalkyl, aryl or aralkyl, x=0 to 2, and X, R', R'' have the definition stated in the case of formula (I).

11. The coating composition as claimed in claim 10, wherein the compound (B) contains between 5 and 95 mol %, based on the entirety of the structural units (I) and (II), of at least one structural unit of the formula (I), and between 5 and 95 mol %, based on the entirety of the structural units (I) and (II), of at least one structural unit of the formula (II).

12. The coating composition as claimed in claim 10, wherein the structural elements (I) and (II) are present in fractions of 2.5 to 97.5 mol %, based on the sum of the functional groups critical for crosslinking in the coating composition, formed from the fractions of the hydroxyl and isocyanate groups and from the fractions of the structural elements (I) and (II).

13. The coating composition as claimed in claim 10, in the polyisocyanate (B), between 2.5 and 90 mol % of the isocyanate groups in the core polyisocyanate structure have undergone reaction to structural units (I) and between 2.5 and 90 mol % of the isocyanate groups in the core polyisocyanate structure have undergone reaction to structural units (II) and/or the total fraction of the isocyanate groups in the core polyisocyanate structure which have undergone reaction to the structural units (I) and/or (II) is between 5 and 95 mol %, and/or wherein the core polyisocyanate structure is selected from the group of 1,6-hexamethylene diisocyanate, isophorone diisocyanate, and 4,4'-methylenedicyclohexyl diisocyanate, the biuret dimers of the aforementioned polyisocyanates and/or the isocyanurate trimers of the aforementioned polyisocyanates.

14. A multistage coating method which comprises applying a pigmented basecoat film to an optionally precoated substrate and thereafter applying a film of the coating composition as claimed in claim 1.

15. The multistage coating method as claimed in claim 14, wherein, following the application of the pigmented basecoat film, the applied basecoat material is first dried at temperatures from room temperature to 80° C. and, following the application of the coating composition as claimed in claim 1, the system is cured at temperatures from 30 to 200° C. for a time of 1 min up to 10 h.

16. The coating composition as claimed in claim 1 wherein the coating composition is a clearcoat material.

17. A multicoat effect and/or color paint system comprising at least one pigmented basecoat and at least one clearcoat disposed thereon, wherein the clearcoat has been produced from a coating composition as claimed in claim 1.

18. The method as claimed in claim 14, wherein the substrate is an automotive vehicle.

19. The method as claimed in claim 18, wherein the pigmented basecoat film and film of the coating composition as claimed in claim 1 are applied as an automotive OEM finishing or refinish coating.

20. A coating composition as claimed in claim 7, comprising a solvent mixture comprising at least 60% by weight butyl acetate, based on the total weight of the solvent mixture.

* * * * *